Aug. 14, 1945.  F. G. WELLINGTON  2,382,525
LEVELING SYSTEM
Filed Nov. 1, 1941    2 Sheets-Sheet 1

INVENTOR.
Fred G. Wellington
BY
ATTORNEY.

Aug. 14, 1945.    F. G. WELLINGTON    2,382,525
LEVELING SYSTEM
Filed Nov. 1, 1941    2 Sheets-Sheet 2
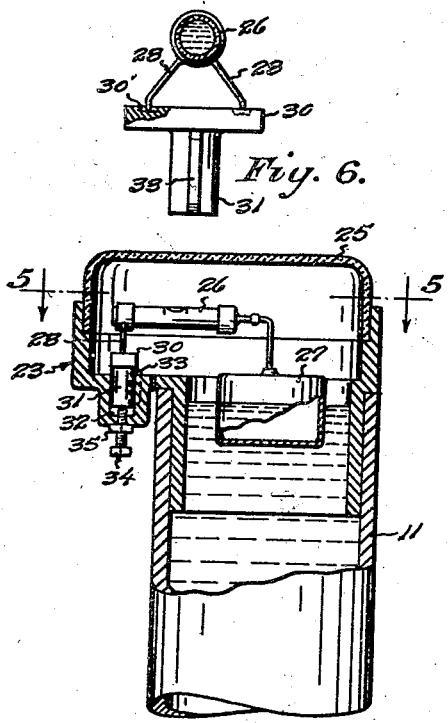
Fig. 6.
Fig. 4.
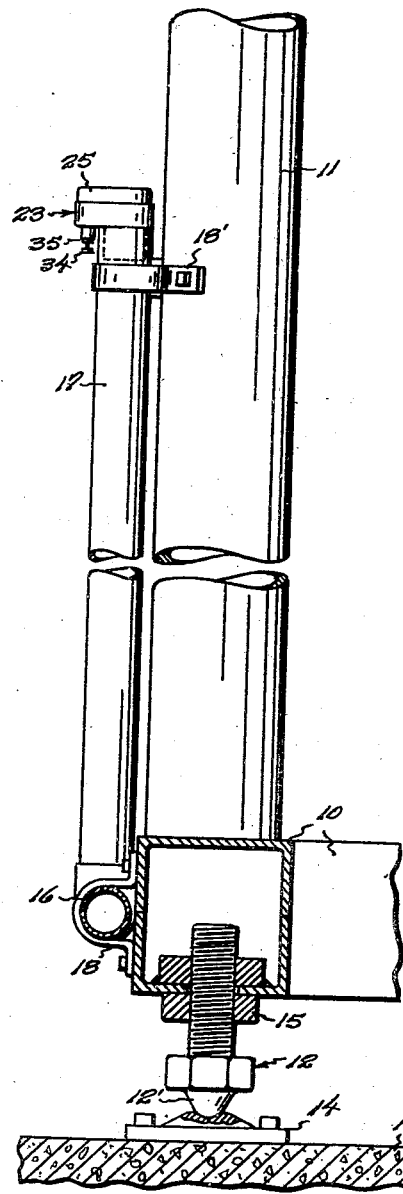
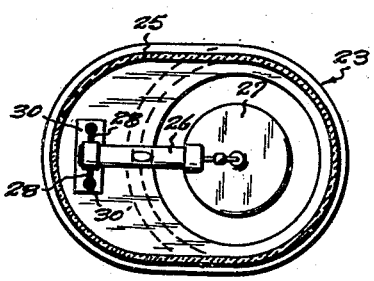
Fig. 5.
Fig. 3.
INVENTOR.
Fred G. Wellington
BY
ATTORNEY.

Patented Aug. 14, 1945

2,382,525

UNITED STATES PATENT OFFICE 2,382,525

LEVELING SYSTEM

Fred G. Wellington, Seattle, Wash., assignor to Paul Wickstrom, Seattle, Wash.

Application November 1, 1941, Serial No. 417,520

6 Claims. (Cl. 33—209)

This invention relates to a leveling system, and for its general object aims to provide a comparatively simple device permitting extreme accuracy of leveling as between a severalty of points located at horizontally spaced intervals.

While the invention is in no way limited as to application, its peculiar adaptability to the airplane industry in truing the vertical columns of jig frames might almost type the invention as a specific therefor, and it is believed to be of benefit in point of clarity to herein preface the description by briefly considering the difficulty which has been encountered in leveling a jig frame preliminary to the start of a structural operation and the practical impossibility, as leveling has been heretofore carried on, of thereafter maintaining within permitted tolerances the trued condition into which the jig-frame has been put.

It may be here stated that the usual jig-frame is composed of horizontal floor girders, most generally box-channel members, assembled together in a series of connected rectangular patterns and each supporting, at spaced intervals of the length, a severalty of upright columns, the whole being welded as a unit and functioning to produce alternate walk-ways and work-sections. Directly below each column is a jack-screw engaging a nut welded to the box-channel and finding a footing on a bearing plate bolted to the concrete floor of the jig-room, the jack-screws permitting a truing of the jig-frame through the act of raising or lowering the box-channel girders at the respective points of the columns.

Transit levels have been more or less standard heretofore as a means of arriving at a considered true level, and while such an instrument in the hands of an expert is highly accurate, it has been the exception rather than the rule to accomplish a jig-frame leveling operation without exceeding the engineer's blue-print specifications of acceptable tolerance. However, aside from the fact of the inaccurate results which often follow from the use of transits where junior engineers have been assigned to perform the work of leveling the jig-frames, the extended period of time required for transit leveling is a major objection to their use and has been a prime deterrent against carrying on periodic levelings during the structural operation of building a wing or body part, as the case may be, with the frequency necessary to assure the desired, if not actually the required, accuracy in the ultimate plane. As indicative of the distortional stresses to which a jig-frame is subjected during a structural operation within the same, it may be pointed out by way of example that the passing of a locomotive and cars, or even a heavily-loaded truck, at distances of several hundred yards has been known to produce a ground fall below the jig-room developing .040, and more, sag, in consequence causing a very major discrepancy between the gauge points of the jig-frame. After such a disturbance, as long as ten hours may be required for the ground structure below the floor of the jig-room to return to normalcy, wherefore it is essential to accuracy in the end product of the jig that leveling compensations be made at very frequent intervals during the period of ground readjustment.

Having the foregoing in mind, it is a further and a more particular object of my invention to devise a system employing the principles of the liquid-tube level using a riser tube for each of the several columns of the jig-frame, in association with indicator devices for the respective risers highly sensitive to variations from a predetermined true level, the entire system being one substantially free from liability of becoming disordered or defective and one which may be quickly and accurately read.

The invention consists in the novel construction and in the adaptation and combination of parts hereinafter described and claimed.

In the drawings:

Fig. 3 is a fragmentary transverse vertical section taken to an enlarged scale on line 3—3 of Fig. 2.

Fig. 4 is a fragmentary transverse vertical section to a scale still further enlarged and detailing the spirit-glass and associated structure which I employ as my preferred indicator.

Fig. 5 is a horizontal section on line 5—5 of Fig. 4; and

Fig. 6 is a further enlarged end elevational view detailing the fulcrum mounting for the spirit-glass and representing the latter in vertical section.

Figure 2:
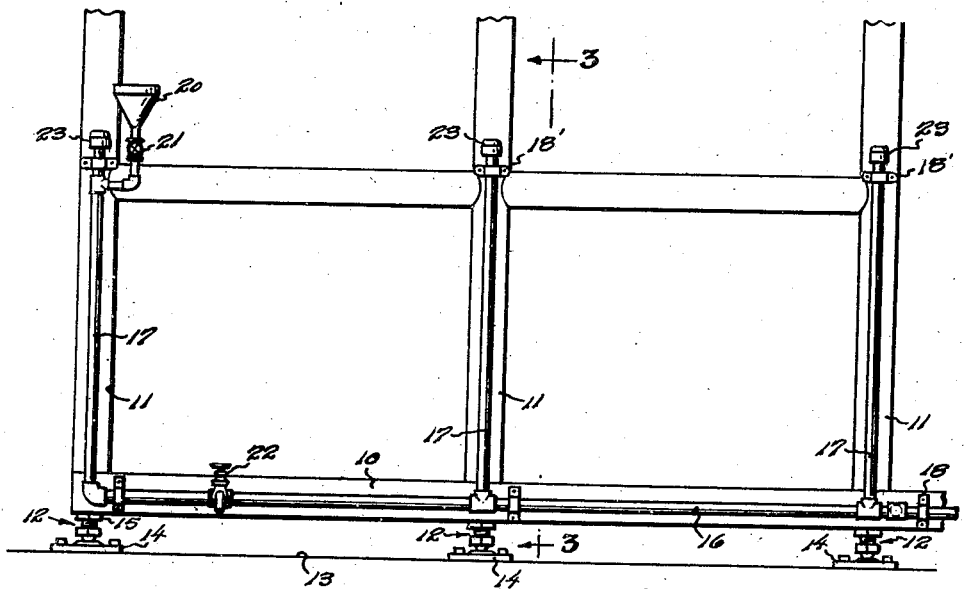
Fig. 2 is an elevational view thereof.
Figure 1:
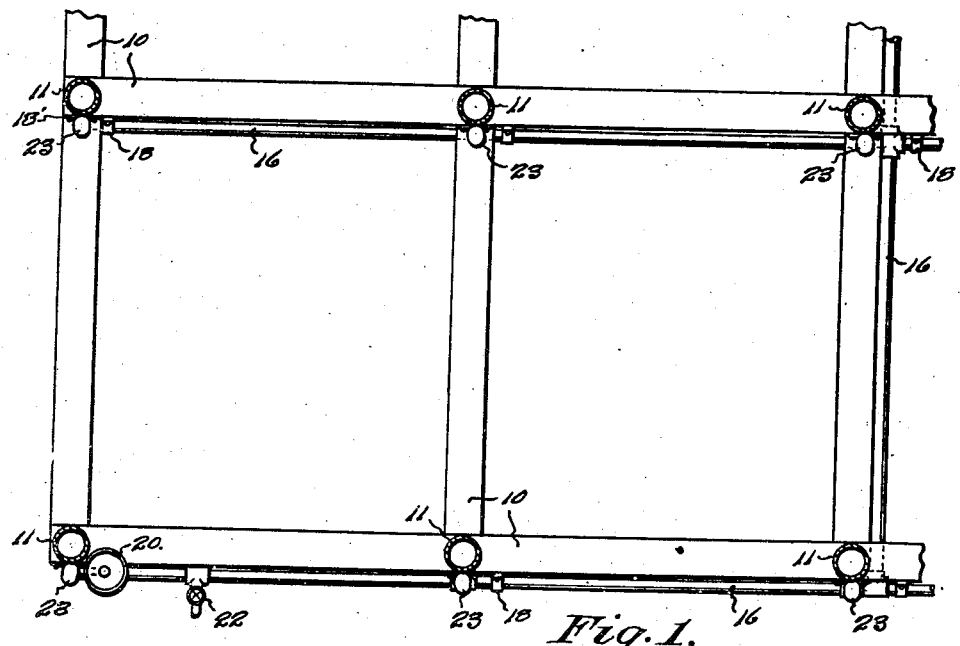
Figure 1 is a fragmentary view taken in horizontal section through a portion of a jig-frame showing the now preferred embodiment of the present invention applied thereto.

The numeral 10 in the drawings denotes the horizontal box-channel members and 11 the vertical columns of a jig-frame supported by jack-screws 12 in elevated relation above the floor 13 of a jig-room, the jack-screws lying immediately below the several columns and being of the usual construction providing a bearing head 12' working against a foot-plate 14 and having a lock-nut 15 for securing the same in adjusted position.

According to the present invention I attach to the box-channels 10 a series of connected pipes constituting a supply main 16, and to this supply main connect branch pipes 17 to have the latter rise to substantially similar heights perpendicularly along the sides of each of the jig columns 11. Any means of support may be employed, straps 18—18' being indicated for this purpose. Connected by the usual fittings to one of the risers to have the same lie in elevated relation above the same is a funnel reservoir 20 complemented by a control cock 21, and provided in the supply main in proximate relation to this funnel-supporting riser is a drain valve 22.

Indicated by 23 are vented hydrostatic leveling heads fitted with glass covers 25 and applied in surmounting relation to the several risers, and housed in each of these heads is an indicator instrument comprised of a bubble spirit-glass 26 having fixedly hung from one of its ends a hermetically sealed float 27 and being fitted at its opposite end with a bipedal stand of which the two limbs 28 diverge downwardly from opposite sides of the longitudinal median line of the glass and find a pivotal footing in surface cups 30' of a fulcrum mounting 30. It will be understood that the fulcrum mounting functionally locates the float, and that this fulcrum point in the respective head might be formed as an integral shelf in the event of collimating the system to have each of the several branch pipes 17 rise to exactly the same height from the base plane of the frame. Such a collimating procedure would, however, be somewhat of a difficult undertaking and may be obviated through the instrumentality of providing for each leveling head a means of adjusting the fulcrum point vertically. As a means suitable for this purpose I have illustrated the mounting 30 as having a depending stem 31 arranged to slidably fit in a cylindrical socket 32 formed in a wing extension of the head. The stem is held against revoluble shifting by a key 33, and is adjusted vertically by a screw 34 which is fixed in adjusted position by a lock-nut 35. Not indicated in the drawings but employed as a convenience to permit the spirit-glass to be set on the fulcrum mounting of a respective hydrostatic head in the absence of liquid within the risers is an abutment rod carried transversely from one to the other side wall of the head in spaced relation below the level plane occupied by the water-glass, its purpose being only that of forming a rest for the outer end of the glass.

The mode of using the invention is believed to be clear from the foregoing, but may be briefly summarized by stating that the jig-frame with the leveling system applied thereto, following erection, is first trued through suitable instruments, following which the leveling system is filled through the funnel with water or other desired liquid with the admission being governed by recourse to the spirit-glass of the most convenient riser, ordinarily the riser from which the funnel is supported. Each of the remaining risers, which is to say the spirit-glass thereof, is thereupon adjusted by means of the respective screws 34 to bring the indicator bubbles directly between the reading lines of the glasses. It is, obviously, a matter of but little time and effort to thereafter ascertain discrepancies in the jig-frame as between the several guide-points, and to correct the same with the jack-screws to level the disturbed bubble or bubbles. Adjustments to within .0015 of absolute level are accomplished without more than ordinary care, whereas .0075 variation has been heretofore considered an exceptional showing.

While I have illustrated and particularly described the embodiment of the invention now preferred by me, it is my intention that no limitations be implied therefrom, and that the following claims be read with only such restrictions as are necessarily brought into the same to distinguish over prior knowledge in the art.

What I claim is:

1. A liquid-tube leveling system comprising the combination of a manifold having a plurality of substantially fixed risers extending upwardly as branches to substantially similar heights from the manifold; hydrostatic heads for the respective risers; float-operated indicator devices for the respective risers housed in said heads and characterized by movement relatively in correspondence with changing levels of the liquid within the related risers; means for supplying liquid to the system for bringing the liquid within a selected riser, employed as a prime reader, to a desired level arrived at by recourse to the related indicator device; and means having operative connection with the indicator devices of the other said risers permitting the latter to be individually adjusted relative to a related hydrostatic head in attaining a reading of the latter said indicator devices corresponding to that of the prime reader, said means permitting correlation as between the several indicator devices without disturbing either the hydrostatic heads or the liquid levels therein.

2. A liquid-tube leveling system comprising the combination of a manifold having a plurality of risers extending upwardly as branches to substantially similar heights from the manifold; and indicator devices for respective risers comprising a bubble spirit-glass having a float carried from one end thereof and at the other end being fitted with a bipedal stand of which the two limbs diverge downwardly from opposite sides of the longitudinal median line of the glass and find a fulcrum footing functionally disposing the float relative to the liquid within the riser.

3. A liquid-tube leveling system comprising the combination of a manifold having a plurality of risers extending upwardly as branches to substantially similar heights from the manifold; hydrostatic heads surmounting the respective risers, said heads being vented from the undersides and presenting substantially imperforate lids sealing the chambers of the heads against gravitationally deposited dust; and indicator devices for the respective risers housed in the hydrostatic heads and characterized by movement relatively in correspondence with changing levels of the liquid within the related risers.

4. A liquid-tube leveling system comprising the combination of a manifold having a plurality of risers arranged to extend upwardly as branches to substantially similar heights from the manifold, provided with pivoted means float-operated from the liquid within the risers and entirely housed by the latter for indicating changing levels of the liquid within the respective risers, and means for adjusting the pivots for said indicating means vertically in relation to the related risers.

5. Structure according to claim 4 including capping members surmounting the risers, providing a chamber completely housing the related indicator devices, and presenting inspection windows for viewing the housed indicators, said capping members providing a vent leading upwardly into a respective said chamber.

6. As a liquid-level indicator, and in combination with a liquid container; a tube having an indicator bubble hermetically sealed therein and carrying a float; means supported by the container forming a fulcrum-mount for the tube to functionally dispose the float relative to the liquid of the container, and means for adjusting the fulcrum-mount vertically in relation to the container for leveling the bubble of the tube to varying selected levels of the liquid within the container.

FRED G. WELLINGTON.